(12) United States Patent
Bratkovski et al.

(10) Patent No.: US 9,201,166 B2
(45) Date of Patent: Dec. 1, 2015

(54) HOLOGRAPHIC MIRROR FOR OPTICAL INTERCONNECT SIGNAL ROUTING

(75) Inventors: Alexandre M. Bratkovski, Mountain View, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1106 days.

(21) Appl. No.: 13/258,411

(22) PCT Filed: Apr. 28, 2009

(86) PCT No.: PCT/US2009/041995
§ 371 (c)(1),
(2), (4) Date: Sep. 21, 2011

(87) PCT Pub. No.: WO2010/126493
PCT Pub. Date: Nov. 4, 2010

(65) Prior Publication Data
US 2012/0014643 A1  Jan. 19, 2012

(51) Int. Cl.
| | |
|---|---|
| G02B 1/00 | (2006.01) |
| B82Y 20/00 | (2011.01) |
| G02B 5/08 | (2006.01) |
| G02B 6/02 | (2006.01) |
| G02B 6/293 | (2006.01) |
| G02B 5/32 | (2006.01) |
| G03H 1/02 | (2006.01) |

(52) U.S. Cl.
CPC ............... *G02B 1/005* (2013.01); *B82Y 20/00* (2013.01); *G02B 5/08* (2013.01); *G02B 6/0229* (2013.01); *G02B 6/02085* (2013.01); *G02B 6/2931* (2013.01); *G02B 6/29323* (2013.01); *G02B 6/29334* (2013.01); *G02B 5/32* (2013.01); *G02B 6/021* (2013.01); *G03H 1/0244* (2013.01)

(58) Field of Classification Search
None
See application file for complete search history.

(56) References Cited

U.S. PATENT DOCUMENTS

| | | | | |
|---|---|---|---|---|
| 4,449,781 | A * | 5/1984 | Lightstone et al. | 385/43 |
| 6,757,463 | B2 * | 6/2004 | Hutchinson et al. | 385/37 |
| 6,904,200 | B2 * | 6/2005 | Wang et al. | 385/37 |
| 7,333,692 | B1 * | 2/2008 | Mossberg et al. | 385/37 |
| 2003/0039443 | A1 | 2/2003 | Catchmark et al. | |
| 2005/0002628 | A1 | 1/2005 | Rahman et al. | |
| 2006/0008206 | A1 | 1/2006 | Maisenhoelder et al. | |

FOREIGN PATENT DOCUMENTS

EP       1811322       7/2007

\* cited by examiner

*Primary Examiner* — Michelle R Connelly
*Assistant Examiner* — John M Bedtelyon
(74) *Attorney, Agent, or Firm* — Thorpe North & Western

(57) ABSTRACT

A holographic mirror 10 for re-directing an optical signal that includes a base 14 having an outer surface 16, and a plurality of discrete nano-structures 12 formed into the outer surface of the base. Each nano-structure has an out-of-plane dimension 20 that is within an order of magnitude of one or both in-plane dimensions 22. The plurality of nano-structures are configured in a repeating pattern with a predetermined spacing 18 between nano-structures for re-directing an optical signal.

9 Claims, 6 Drawing Sheets

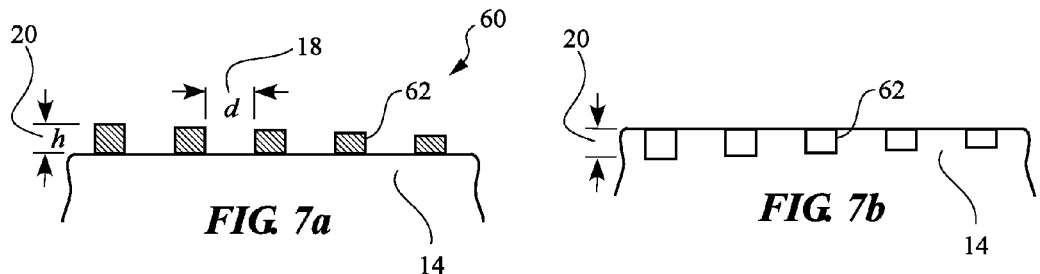
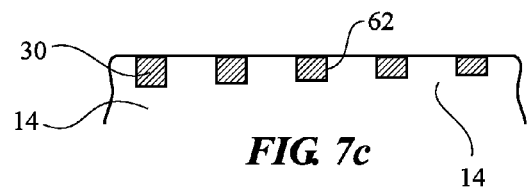
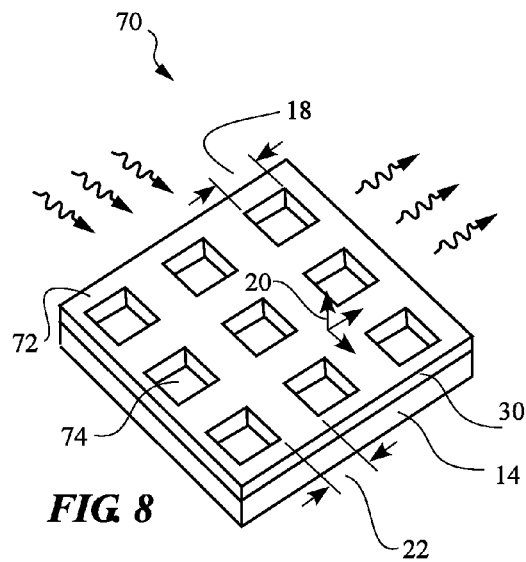
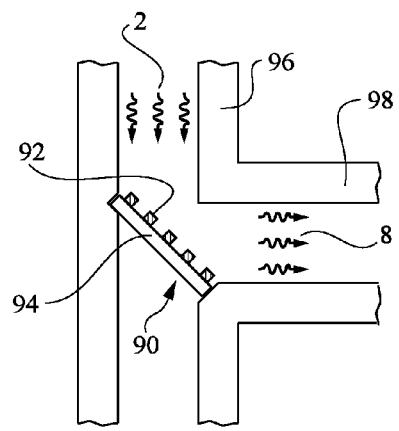

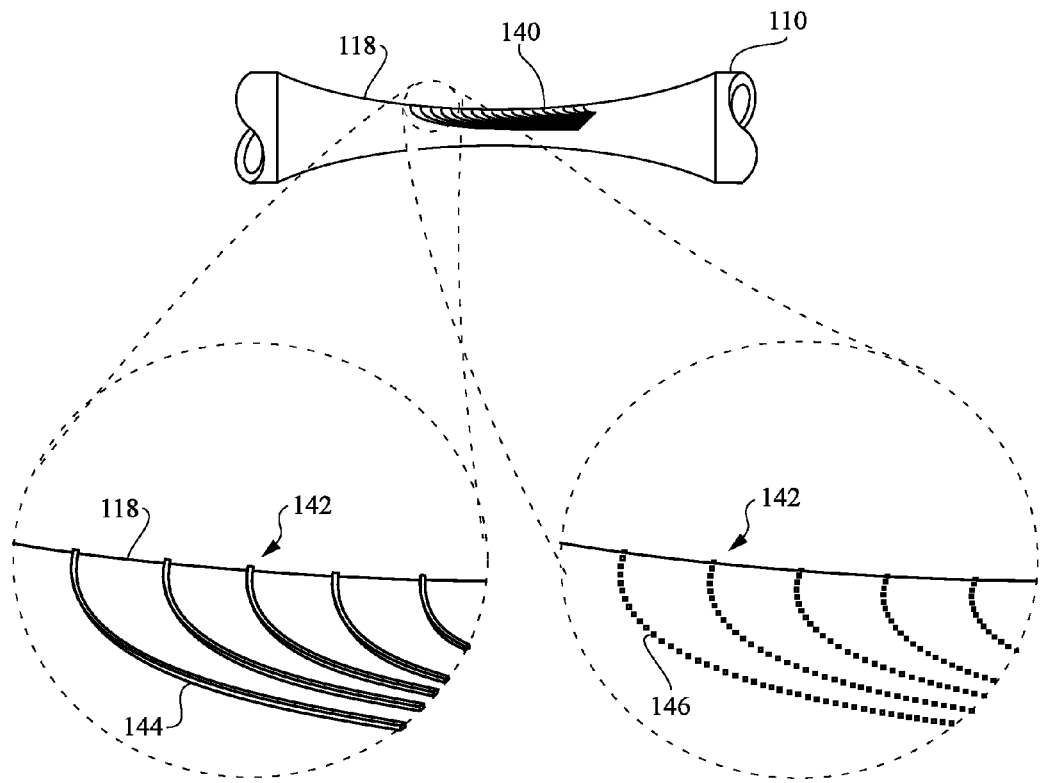
FIG. 14a  FIG. 14b
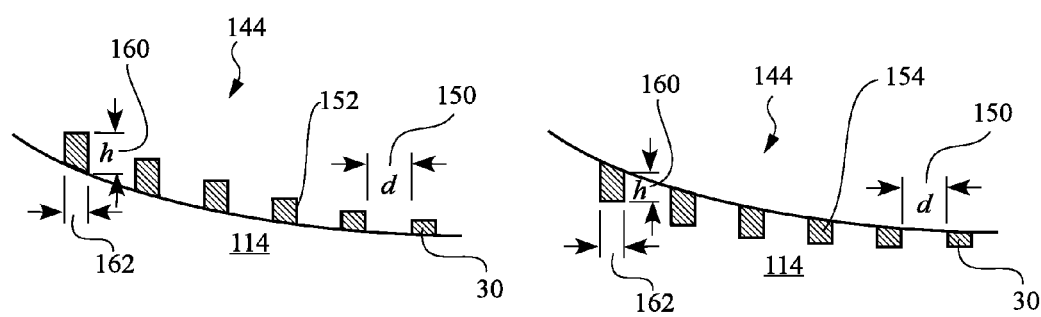
FIG. 15a  FIG. 15b

HOLOGRAPHIC MIRROR FOR OPTICAL INTERCONNECT SIGNAL ROUTING

BACKGROUND

As the information technology marketplace continues to push computers and networking systems towards ever greater performance, optical networks are being developed to handle the increased speeds and to provide the greater bandwidth desired for moving large amounts of data. Interconnecting the optical fibers and waveguides forming these advanced networks continues to be challenging, however, due to the inherent inefficiencies and the high sensitivity to alignment and fabrication errors found in current optical components. Systems and methods for routing optical signals between the optical fibers or waveguides that are less sensitive to optical component fabrication and placement errors, and which can provide for increased efficiency in routing the optical signal from one communications pathway to another, can be valuable.

BRIEF DESCRIPTION OF THE DRAWINGS

FIGS. 7a-7c together illustrate cross-sectional views of additional variations on the embodiments of FIGS. 1 and 3;

FIG. 8 illustrates a perspective view of a holographic mirror in accordance with another representative embodiment;

FIG. 9 illustrates an exaggerated side schematic view of the holographic mirror of FIG. 1 positioned within a T-junction between two optical fibers or hollow metal waveguides, in accordance with one representative embodiment;

FIG. 14a illustrates a close-up schematic view of the optical fiber and holographic mirror of FIG. 11, in accordance with one representative embodiment;

FIG. 14b illustrates a close-up schematic view of the optical fiber and holographic mirror of FIG. 11, in accordance with another representative embodiment; and FIGS. 15a and 15b together illustrate cross-sectional views of variations on the optical fiber and holographic mirror of FIG. 14a.

DETAILED DESCRIPTION

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made to the invention without departing from the spirit and scope of the present invention. As such, the following detailed description is not intended to limit the scope of the invention as it is claimed, but rather is presented for purposes of illustration, to describe the features and characteristics of the representative embodiments and to sufficiently enable one skilled in the art to practice the invention. Accordingly, the scope of the present invention is to be defined solely by the appended claims.

A system and method are provided for a holographic mirror for re-directing an optical signal between optical fibers or hollow-metal waveguides, and which can replace the optical mirrors, beam-splitters and optical gratings, etc., currently used for routing optical signals. The various representative embodiments of the holographic mirror described herein can allow for a more efficient, fabrication-error and misalignment-error tolerant system and method of routing optical signals between fibers or waveguides.

The simple mirrors, smooth-surfaced beamsplitters and optical gratings currently available in the optical networking industry have wide-angular distribution and poor directionality, both of which can lead to large optical losses. Furthermore, such mirrors and beamsplitters and gratings require high-precision manufacturing to maintain consistent optical performance, and are susceptible to errors in both fabrication and placement that can result in additional losses. In contrast, the holographic mirror can yield a collimated reflected light beam that can be coupled into a crossing fiber or waveguide with an efficiently as high as 99%.

The holographic mirror can also be applied to various optical components and in a wide variety of configurations. For example, in one representative embodiment the holographic mirror can be formed into the outer surface of a base or substrate that is embedded at the cross-section of a T- or X-junction between optical fibers or hollow-metal waveguides, and can re-direct an optical signal traveling within the fiber or waveguide towards another optical communications pathway. In another representative embodiment the holographic mirror can be formed directly into the outer surface of a translucent optical fiber, and can be used to re-direct an evanescent optical signal towards an adjacent but non-contacting optical communications pathway.

Figure 1:
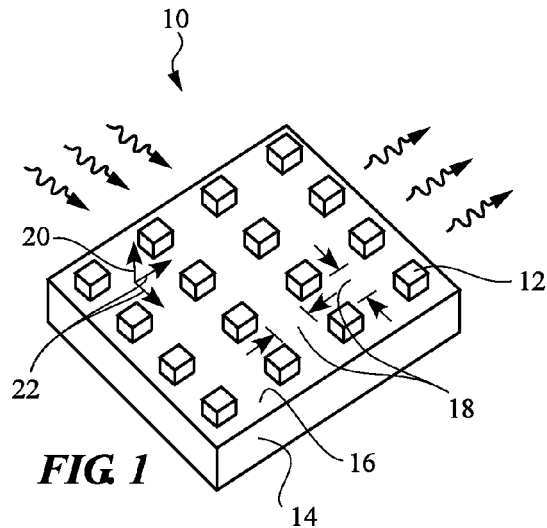
FIG. 1 illustrates a perspective view of a holographic mirror in accordance with one representative embodiment.

FIG. 1 illustrates a perspective view of a holographic mirror 10 having a plurality of discrete dielectric nano-structures 12 formed into the outer surface 16 of a base or substrate 14. The base can be non-reflecting, and in one embodiment can be made from an opaque material that can absorb the optical beam were it not for the nano-structures formed into the outer surface of the base. The base can also be made from a translucent material that can allow the optical beam to pass through the base substantially unhindered were it not for the nano-structures. In other embodiments of the holographic mirror the outer surface of the base can be the flat upper surface of a substantially planar substrate, the curved surface of a lens, or the curved outer surface of an optical cable, etc.

The plurality of discrete dielectric nano-structures 12 formed into the outer surface 16 of the base or substrate 14 can be three-dimensional bodies with dimensions and spacing 18 that have been configured to re-direct the optical signal using three-dimensional interference with a particular wavelength of light, rather than through total or partial reflection of the light beam. In contrast to the sheet-like layers, films and/or polished coatings that are used to create the simple mirrors and smooth-surfaced beamsplitters found in the prior art, each nano-structure can have an out-of-plane dimension 20 that is within an order of magnitude (or factor of 10) of one or both in-plane dimensions 22, such as the width and breadth of the nano-structure. In other words, each nano-structure can have a vertical height or depth that is up to 10× longer or 10× shorter than the horizontal width and breadth of the nano-structure. As a consequence of the three-dimensional aspect of the nano-structures, the form-factor of the nano-structures 12 can be analogous to a post 24 (if projecting outwardly from the base surface) or to a pit 26 (if projecting inwardly). In one aspect the out-of-plane dimension 20 of the post or pit can be substantially equal, or within a factor of 2, of one or both in-plane dimensions 22.

Figure 2:
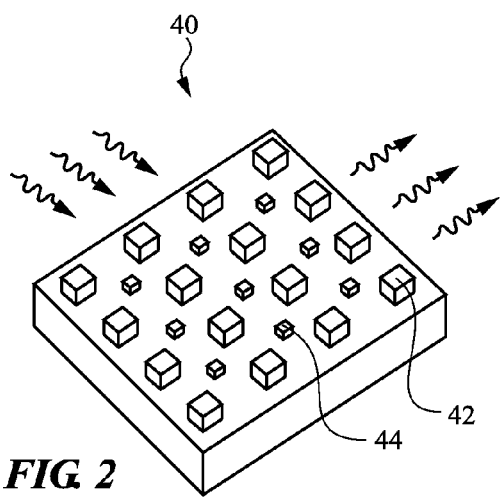
FIG. 2 illustrates a perspective view of a holographic mirror in accordance with another representative embodiment.

As shown in FIG. 1, the plurality of nano-structures 12 can be arranged in a repeating pattern or grid, with a predetermined and uniform spacing 18 between separate nano-structures, to form the holographic mirror 10. Adjacent optical elements can be aligned or offset from each other to form rectangular or diagonal grids. As further illustrated in FIG. 2, the size and shape of the nano-structures can also vary within a single holographic mirror 40, with smaller nano-structures 44 being regularly interspaced with larger nano-structures 42 to make up the optical grid.

Figure 3:
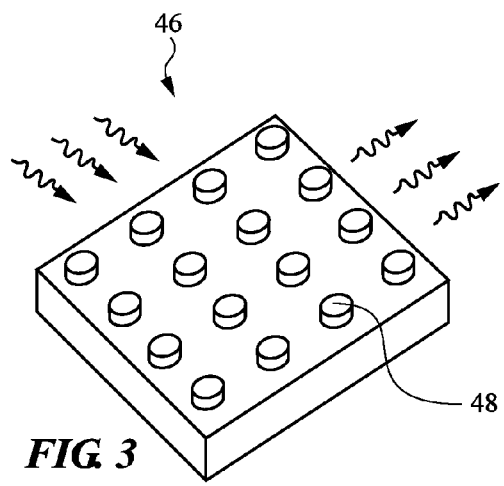
FIG. 3 illustrates a perspective view of a holographic mirror in accordance with yet another representative embodiment.
Figure 4:
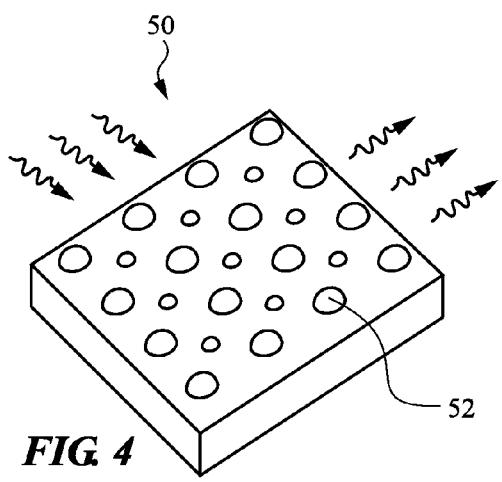
FIG. 4 illustrates a perspective view of a holographic mirror in accordance with yet another representative embodiment.
Figures 5A, 5B:
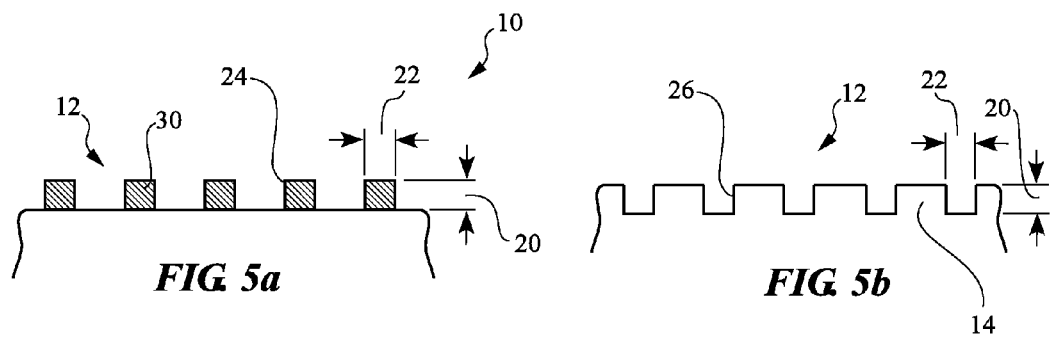
FIGS. 5a-5c together illustrate cross-sectional views of variations on the embodiments of FIGS. 1 and 3.
Figure 5C:
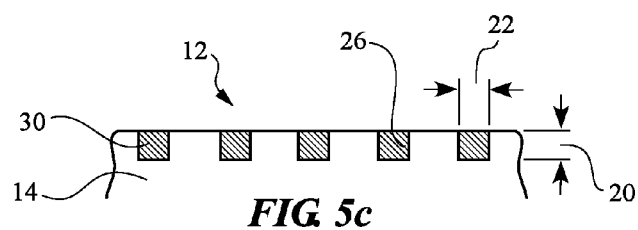
Figures 6A, 6B:
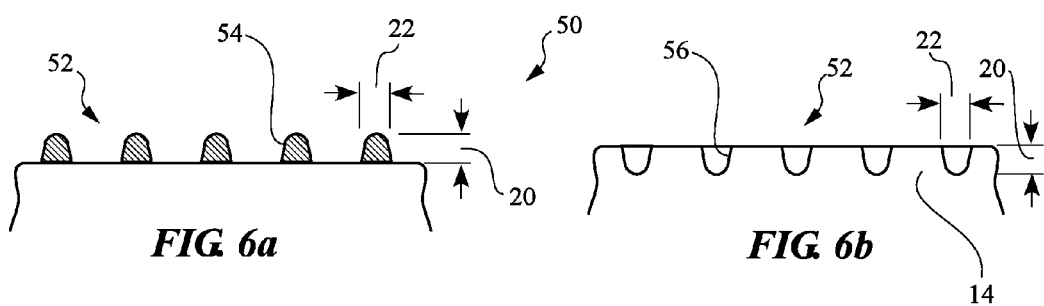
FIGS. 6a-6c together illustrate cross-sectional views of variations on the embodiments of FIG. 4.
Figure 6C:
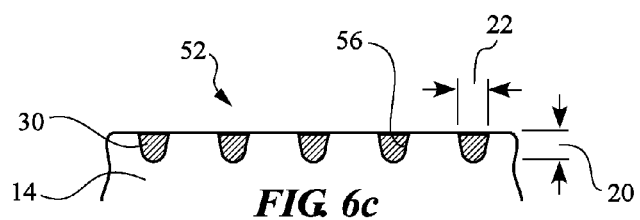

As depicted with the holographic mirrors 46 and 50 illustrated in FIGS. 3 and 4, the posts or pits 48, and 52 can be formed with any cross-sectional shape as viewed from the out-of-plane direction, including square, rectangular, round, hemispherical or oblong shapes, etc. FIGS. 5a-5c and 6a-6c further illustrate that the plurality of nano-structures 12 and 52 comprising holographic mirrors 10 and 50, respectively, can also have flat top, rounded, or hemispherical profiles, etc.

As shown in cross-section in FIGS. 5a-5c and 6a-6c, each nano-structure 12, 52 can be formed from a high-contrast dielectric material 30, such as metallic silver, that can efficiently interact with the incoming optical signal. Other high-contrast dielectric materials can also be used. Thus, the outwardly-directed posts 24, 54 can be built up from the high-contrast dielectric material, while the inwardly-directed pits 26, 56 can be filled with the high-contrast dielectric material. The holographic mirrors formed from inwardly-directed pits filled with high-contrast dielectric material (e.g. metallic silver) can be more effective with translucent, rather than opaque, bases or substrates 14 having an optical index that is substantially less than the optical index of dielectric material or metallic silver.

The nano-structures can be built using any method of nano-structure fabrication known to one of skill in the art, including deposition, photolithography, mechanical machining or laser etching, etc. In one aspect the outwardly-directed dielectric posts can be nano-bubbles interspersed over the outer surface of the base. In another aspects the inwardly-directed pits 26, 56 illustrated in FIGS. 5b and 6b can be left open and un-filled when the optical index of the base 14 is substantially greater than the optical index of the surrounding medium, such as air.

FIGS. 7a-7c illustrates a cross-sectional view of the nano-structures 62 forming holographic mirror 60, the predetermined spacing 18 between the individual nano-structures (or the size of the holes in the periodic hole array), can be optimized to re-direct a selected wavelength of the optical signal. For a given wavelength λ, the spacing d 18 between nano-structures 62 may be less than d=λ/2n where n in the optical index of the base 14. Furthermore, the height h or out-of-plane dimension 20 of the nano-structures 62 can be graded, so that in one aspect the height 20 of the nano-structures can vary gradually from h to h/10 from one side the holographic mirror 60 to the other.

In yet another embodiment of the holographic mirror 70 shown in FIG. 8, the three-dimensional nano-structures can be extended laterally in the in-plane dimensions 22 to merge with adjacent nano-structures, thereby forming a nano-structure grid 72 having a repeating pattern of well-defined holes 74, which embodiment can also known as a periodic hole array. Similar to the posts and pits described above, the holes 74 of the periodic hole array can be formed with any shape, including square, rectangular, round or oblong, etc. except that the hole is empty and the surrounding nano-structure grid 72 that can be formed from one or more layers or strips of high-contrast dielectric material 30 that overlay the base or substrate 14. Also consistent with the posts and pits described above, the out-of-plane dimension 20 (e.g. thickness of the grid or depth of the holes) can be within an order of magnitude (e.g. within a factor of 10) of one or both in-plane dimensions 22 (e.g. the lateral/horizontal of width of a segment of the grid 72) or of the diameter or width 18 of the holes 74. In one representative embodiment the holes can have a depth that is substantially equal to (e.g. within a factor of 2) one or both in-plane dimensions.

Illustrated in FIG. 9 is one representative application of the holographic mirror 90, in which a plurality of nano-structures 92 are formed into the outer surface of a planar substrate 94, and which substrate is then positioned at the cross-section of a T-junction or X-junction between optical fibers 96, 98 or hollow-metal waveguides with spliced-in geometry. Using the three-dimensional dielectric nano-structures 92 of the holographic mirror 90 to interfere with the predetermined wavelength of light, the holographic mirror can provide for a narrow angular distribution and high directionality to re-direct up to 99% of the incoming optical signal 2 as a collimated reflected light beam 8 into the crossing optical fiber or waveguide. Furthermore, the holographic mirror 90 can provide a greater tolerance towards fabrication-errors, since the nano-structures can continue to effectively interfere with the predetermined wavelength of the incoming optical beam despite minor variations in size and shape and spacing in the nano-structures.

Figure 10:
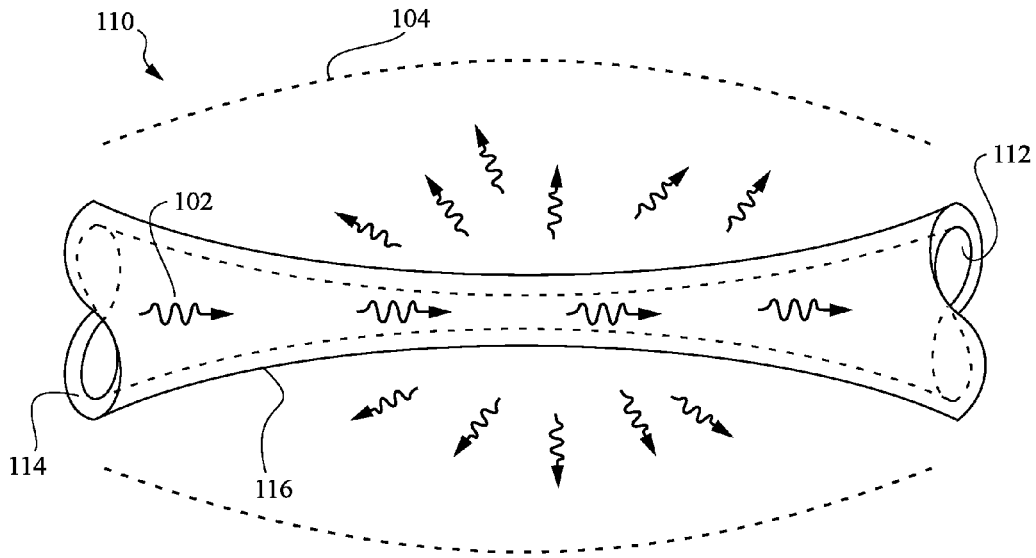
FIG. 10 illustrates a side view of an optical fiber having a tapered section, in accordance with one representative embodiment.
Figure 11:
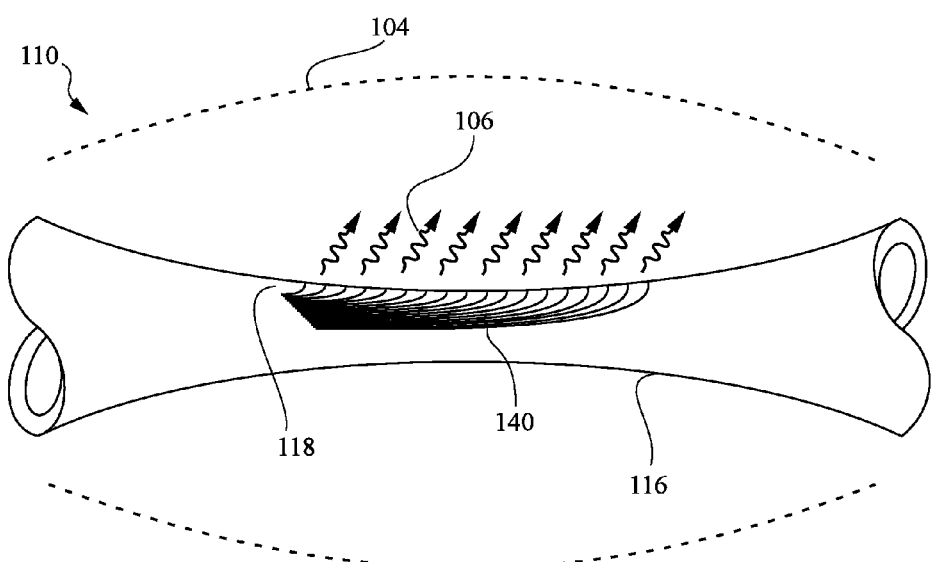
FIG. 11 illustrates a side view of an optical fiber having a holographic mirror formed on an outer surface of a tapered section, in accordance with one representative embodiment.

In another representative embodiment the holographic mirror can be formed directly on the outer surface of a translucent optical fiber, and can be used to re-direct an evanescent optical signal towards an adjacent but non-contacting optical communications pathway. For instance, as shown in FIG. 10, a single-mode or a multi-mode optical fiber 110 having an inner core 112 and a surrounding outer layer 114 can be configured with a tapered region 116 for projecting the optical signal 102 into a halo 104 of evanescent light outside the outer layer. As further shown in FIG. 11, a holographic mirror 140 can then be formed into the curved surface 118 of the tapered region 116 for re-directing the evanescent light away 104 from the first optical fiber 110 and transmitting an optical signal 106 towards a nearby but non-contacting optical fiber.

Figure 12:
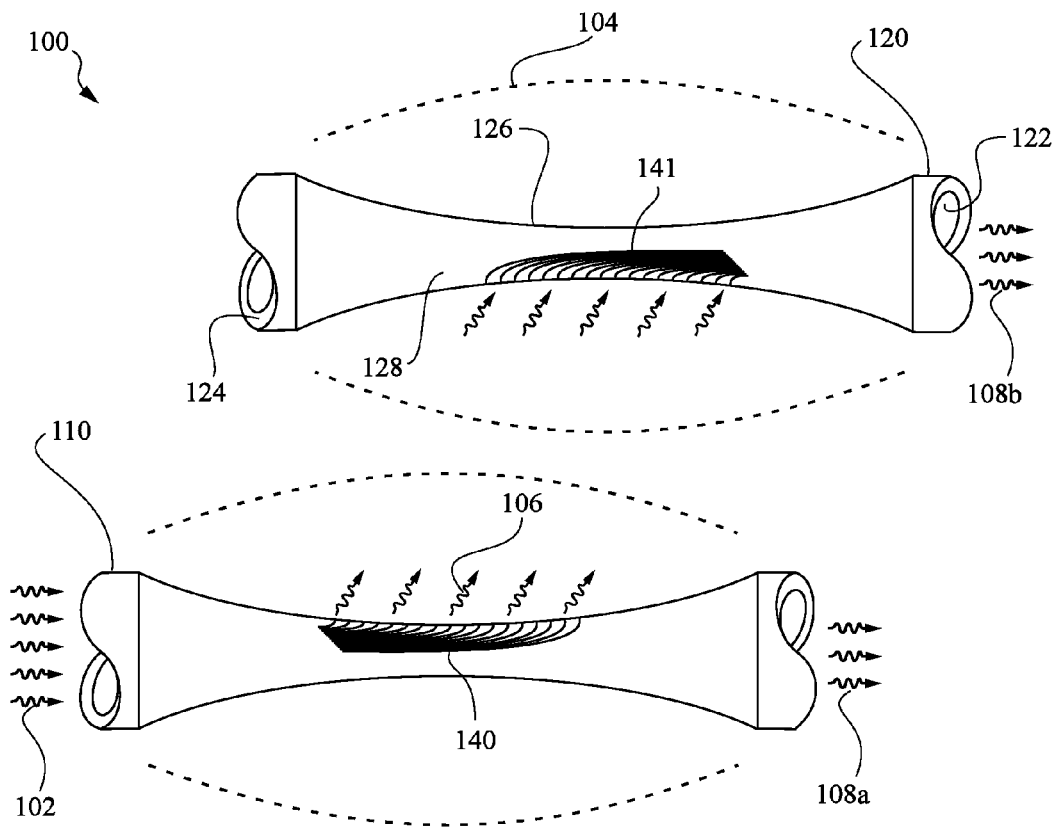
FIGS. 12 and 13 together illustrate side and perspective views of two adjacent optical fibers of FIG. 11.
Figure 13:
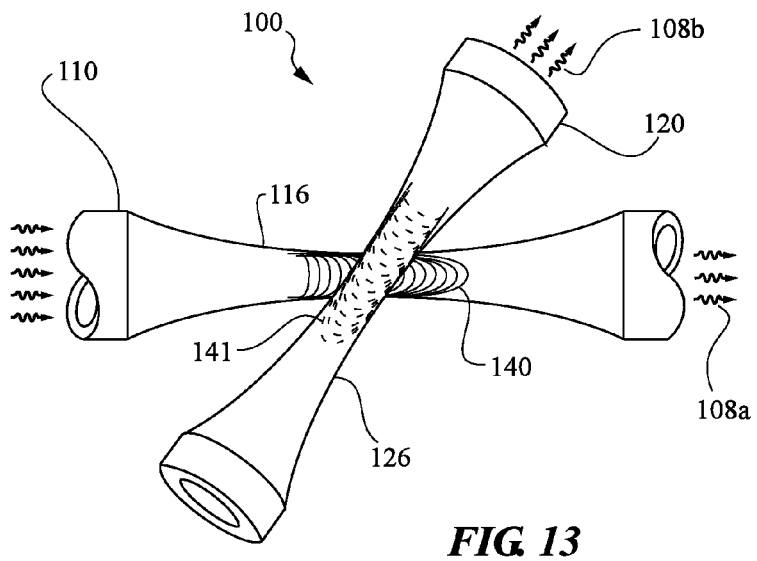

The first optical fiber 110 and the second optical fiber 120 are shown together in FIGS. 12 and 13. The second optical fiber 120 can also have a tapered region 126 with a holographic mirror 141 formed into the curved outer surface 128, which can capture the optical signal 106 from the first optical fiber and couple the signal through the surrounding outer layer 124 into the inner core 122 of the second fiber 120, where the optical signal can continue in along the second optical pathway. Thus, the holographic mirrors 140, 141 can be used in conjunction with the tapered optical fibers 110, 120 to form a non-contacting optical coupler 100 or splitter which can split an incoming optical signal 102 into two outgoing optical signals 108a, 108b traveling through optical fibers 110 and 120, respectively.

As shown in more detail in FIG. 14a, the holographic mirror 140 can comprise nano-structures 142 formed into the curved outer surface 118 of the tapered optical fiber 110. In one aspect the nano-structures 142 can be continuous crescent-shaped optical elements 144 that bend around the curved surfaces of the tapered section 116, as viewed from a direction perpendicular to the holographic mirror. In another representative embodiment shown in FIG. 14b, the crescent-shaped optical elements 144 can be further digitized or separated into a crescent-shaped series of discrete nano-structures 146.

The crescent-shaped optical elements 144 of FIG. 14a are illustrated in more detail in FIGS. 15a-15b. The form-factor of the optical elements 144 can be analogous to a wall 152 if they project outwardly from the base surface 144, or to a groove 154 if projecting inwardly. Each optical element 144 can have an out-of-plane or vertical dimension 160 (height or depth) that is within an order of magnitude, or within factor of 10, of the width 162 of the optical element. In other words, each wall 152 or groove 154 can have a vertical height or depth 160 that is up to 10× longer or 10× shorter than the width 162 of the nano-structure. In one aspect the vertical height or depth 160 of the wall 152 or groove 154 can be substantially equal, or within a factor of 2, of the width 162. Although shown with squared profiles in FIGS. 15a-15b, the optical elements can also be formed with rounded or hemispherical profiles.

Each of the crescent-shaped optical elements 144 can be formed from a high-contrast dielectric material 30, such as metallic silver, that can efficiently interact with the incoming optical signal. Other high-contrast dielectric materials can also be used. Thus, the outwardly-directed walls 152 can be built up from the high-contrast dielectric material, while the inwardly-directed grooves 154 can be filled with the high-contrast dielectric material.

The predetermined spacing 150 between the individual crescent-shaped optical elements 144 can be optimized to re-direct a selected wavelength of the optical signal. For a given wavelength λ, the spacing d 150 between optical elements may be less than $d=\lambda/2n$, where n in the optical index of the material forming the outer layer 114 of the optical fiber 110. Furthermore, the height h 160 or out-of-plane dimension of the optical elements 144 can be graded, so that in one aspect the height of the crescent-shaped optical elements can vary gradually from d to d/10 from one side the holographic mirror to the other.

The foregoing detailed description describes specific representative embodiments. However, it will be appreciated that various modifications and changes can be made without departing from the scope as set forth in the appended claims. The detailed description and accompanying drawings are to be regarded as illustrative, rather than restrictive, and any such modifications or changes are intended to fall within the scope as described and set forth herein.

More specifically, while illustrative representative embodiments have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description.

The limitations in the claims are to be interpreted broadly based on the language employed in the claims and not limited to examples described in the foregoing detailed description or during the prosecution of the application, which examples are to be construed as non-exclusive. For example, any steps recited in any method or process claims may be executed in any order and are not limited to the order presented in the claims. The term "preferably" is also non-exclusive where it is intended to mean "preferably, but not limited to." Accordingly, the scope of the invention should be determined solely by the appended claims and their legal equivalents, rather than by the descriptions and examples given above.

What is claimed is:

1. An evanescent optical interconnect for coupling an optical signal between adjacent optical pathways, comprising:
a first optical pathway including:
    a first outer layer and a first inner core to allow an optical signal to travel therein;
    a first tapered region to project the optical signal into evanescent light outside the first outer layer; and
    a first plurality of optical elements formed into the first outer layer for re-directing evanescent light away from the first optical pathway, wherein the plurality of optical elements each includes a high-contrast dielectric material; and
a second optical pathway adjacent the first optical pathway including:
    a second outer layer and a second inner core;
    a second plurality of optical elements formed into the second outer layer for capturing the evanescent light from the first optical pathway; and
    a second tapered region for projecting the captured evanescent light into the second inner core.

2. The optical interconnect of claim 1, wherein each of the first and second plurality of optical elements has an out-of-plane height dimension within an order of magnitude of an in-plane width dimension; and
the first and second plurality of optical elements are arranged in a repeating pattern with a predetermined spacing between optical elements to direct the light.

3. The optical interconnect of claim 2, wherein the predetermined spacing is optimized to re-direct a selected wavelength of the optical signal.

4. The optical interconnect of claim 2, wherein the first plurality of optical elements further comprise discrete dielectric nano-structures having an out-of-plane dimension within an order of magnitude of both in-plane dimensions.

5. The optical interconnect of claim 2, wherein the first plurality of optical elements are arranged in a crescent-shape along a portion of the first outer layer and comprise outwardly-projecting high-contrast dielectric superstructures.

6. The optical interconnect of claim 2, wherein the first plurality of optical elements are arranged in a crescent-shape along a portion of the first outer layer and comprise inwardly-projecting grooves.

7. The optical interconnect of claim 6, wherein the inwardly-projecting grooves are filled with metallic silver.

8. The optical interconnect of claim 1, wherein the first and second optical pathways are single-mode optical fibers.

9. The optical interconnect of claim 1, wherein the first and second optical pathways are multi-mode optical fibers.

* * * * *